US012766546B2

(12) United States Patent
Garza et al.

(10) Patent No.: US 12,766,546 B2
(45) Date of Patent: *Oct. 20, 2026

(54) APPLICATORS AND ACCESSORIES FOR DISPENSING GLUE AND OTHER MATERIALS

(71) Applicant: My Sweet Petunia, Inc., Humble, TX (US)

(72) Inventors: Iliana Garza, Humble, TX (US); Richard Jones, Bridgend (GB)

(73) Assignee: My Sweet Petunia, Inc., Humble, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/916,634

(22) Filed: Oct. 15, 2024

(65) Prior Publication Data

US 2025/0033080 A1 Jan. 30, 2025

Related U.S. Application Data

(63) Continuation of application No. 18/234,783, filed on Aug. 16, 2023, now abandoned, which is a continuation of application No. 18/195,402, filed on May 10, 2023, now Pat. No. 11,772,121.

(60) Provisional application No. 63/448,071, filed on Feb. 24, 2023.

(51) Int. Cl.

| | |
|---|---|
| ***B05D 5/10*** | (2006.01) |
| ***A21C 15/00*** | (2006.01) |
| ***B05B 1/32*** | (2006.01) |
| ***B05B 11/04*** | (2006.01) |
| ***B05B 15/50*** | (2018.01) |
| ***B05B 15/62*** | (2018.01) |
| ***B05B 15/63*** | (2018.01) |
| ***B05C 17/005*** | (2006.01) |
| ***B05D 1/26*** | (2006.01) |

(52) U.S. Cl.

CPC ...... *B05C 17/00583* (2013.01); *A21C 15/005* (2013.01); *B05B 11/048* (2013.01); *B05B 15/50* (2018.02); *B05B 15/62* (2018.02); *B05B 15/63* (2018.02); *B05C 17/00503* (2013.01); *B05C 17/0052* (2013.01); *B05D 1/26* (2013.01); *B05B 1/32* (2013.01); *B05D 5/10* (2013.01)

(58) Field of Classification Search

CPC ........ B05C 17/00583; B05C 17/00503; B05C 17/0052; B05D 1/26; B05D 5/10; A21C 15/005; B05B 15/50; B05B 15/62; B05B 15/63; B05B 11/048; B05B 1/32

See application file for complete search history.

(56) References Cited

U.S. PATENT DOCUMENTS 4,334,622 A * 6/1982 Mutschler ............ B43M 99/007 211/69.5
4,353,726 A * 10/1982 Rough, Sr. .............. C03B 3/023 165/111
5,590,831 A * 1/1997 Manson ............... H01H 9/0235 236/51
5,992,694 A * 11/1999 Keller ................. B05C 17/0126 222/391

(Continued)

*Primary Examiner* — Frederick C Nicolas
(74) *Attorney, Agent, or Firm* — Shane Cortesi

(57) ABSTRACT

Applicators for glue and other squeeze bottles are described. The applicator may include an arm that compresses the squeeze bottle, and a chamber with ribs that also compresses the bottle.

23 Claims, 14 Drawing Sheets

(56) References Cited

U.S. PATENT DOCUMENTS

| | | | | | |
|---|---|---|---|---|---|
| 5,993,220 | A * | 11/1999 | Nakamura | G10H 1/363 | |
| | | | | 84/610 | |
| 6,000,581 | A * | 12/1999 | Woodruff | B05B 11/1095 | |
| | | | | 222/327 | |
| 6,234,348 | B1 * | 5/2001 | Okamura | B05C 17/00583 | |
| | | | | 222/391 | |
| 6,981,868 | B2 * | 1/2006 | Okawa | A61C 5/50 | |
| | | | | 222/326 | |
| 9,543,200 | B2 * | 1/2017 | Park | H10W 20/0526 | |
| 9,643,200 | B2 * | 5/2017 | Belanger | B05B 11/048 | |
| 11,772,121 | B1 * | 10/2023 | Garza | A21C 15/005 | |
| | | | | 222/95 | |
| 11,872,585 | B1 * | 1/2024 | Garza | F16M 11/22 | |
| D1,051,684 | S * | 11/2024 | Garza | D8/51 | |
| 2016/0175878 | A1 * | 6/2016 | Belanger | B05B 12/002 | |
| | | | | 222/325 | |
| 2018/0333742 | A1 * | 11/2018 | Lee, III | B05C 17/0103 | |

* cited by examiner

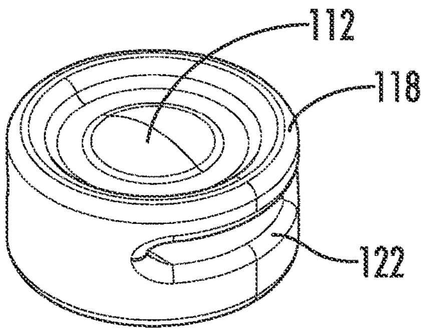
FIG. 17
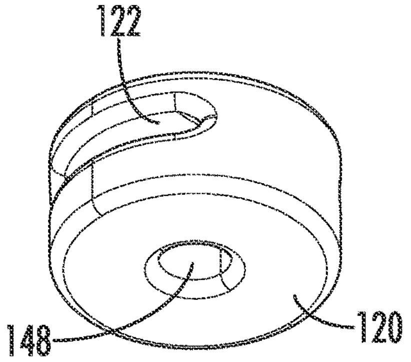
FIG. 18
FIG. 19
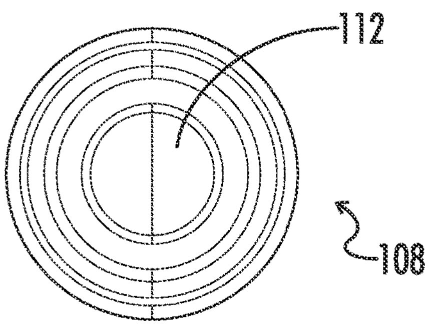
FIG. 20
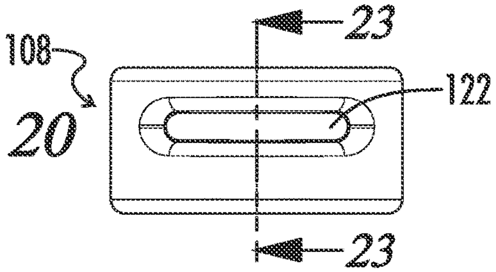
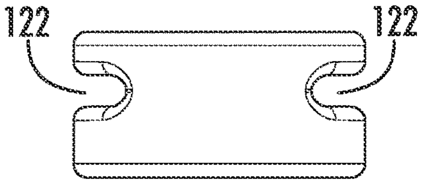
FIG. 22
FIG. 21
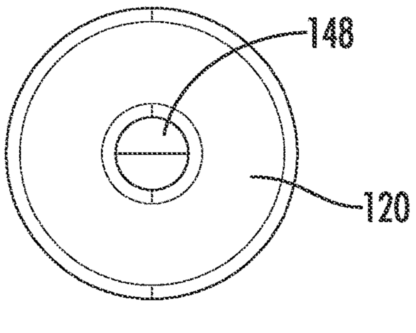

APPLICATORS AND ACCESSORIES FOR DISPENSING GLUE AND OTHER MATERIALS

BACKGROUND

Technical Field

The present invention relates to applicators for dispensing glue and other materials, and stands for such applicators.

Background of the Invention

Glue guns are known and typically include a handle, a trigger and a chamber for receiving glue.

While glue guns typically dispense heated glue, glue guns that dispense cold glue are described in, for example, U.S. Pat. No. 9,643,200.

Precision cold glue bottles are known and typically include a squeezable bottle with a hollow needle for dispensing glue, and a removable cap with a pin that mates with the needle to seal the needle. Examples of such glue bottles include the NUVO Deluxe Adhesive sold by Tonic Studios, Ltd. (Pyle, Wales, United Kingdom). Unfortunately, the difficulty with such bottles is that it can be difficult to mate the pin to the needle to seal the needle, and, if unsealed, the glue can dry out or clog.

Stands for glue applicators are also known. For example, glue bottle holders are designed to hold squeeze containers upright on a flat surface with the hollow needle/applicator facing downwardly toward the flat surface.

SUMMARY OF THE INVENTION

The present disclosure provides applicators and stands for such applicators.

In some embodiments, the present disclosure provides a method of dispensing a substance from a squeeze container that may include one or more of the following steps: a) providing an applicator that may include one or more of the following: i) an applicator front end; ii) an applicator rear end; iii) an applicator length extending from the applicator front end to the applicator rear end; iv) an applicator top; v) an applicator bottom; vi) an applicator height extending from the applicator top to the applicator bottom and generally perpendicular to the applicator length; vii) a chamber that may include a chamber front end comprising a front opening, a chamber rear end, and a chamber length extending from the chamber front end to the chamber rear end and that may be parallel to the applicator length, and is configured to house the squeeze container; viii) at least one wall that may include an exterior surface and an interior surface, that may at least partially surround the chamber, and may further include a plurality of ribs that may be spaced about a perimeter of the interior surface, protrude into the chamber, and are configured to compress the squeeze container; ix) a handle that may extend generally downwardly from the at least one wall, and include a handle bottom; x) a trigger that may be located adjacent to the handle; and xi) at least one arm that may be coupled to the trigger and configured to protrude into the chamber and compress a squeeze container located in the chamber; b) placing a squeeze container that includes a substance into the chamber so that at least a portion of the squeeze container extends through the forward opening and the plurality of ribs at least partially compress the squeeze container; and c) actuating the trigger to cause the arm to move toward (e.g., into the chamber) and compress the squeeze container, which causes the substance to be dispensed from the squeeze container.

Optionally, the chamber comprises a partially open top. Optionally, the chamber rear end comprises a rear opening to allow a user to load the squeeze container from the rear. Optionally, the plurality of ribs are located not more than 0.5 inches from the front opening. Optionally, the plurality of ribs are located at approximately the same distance along the chamber length. Optionally, the plurality of ribs comprise three ribs spaced substantially equally apart. Optionally, the chamber comprises a chamber bottom comprising a hole receiving the arm, a chamber left side, a chamber right side, and a chamber length extending from the chamber left side to the chamber right side and generally perpendicular to the applicator height and length. Optionally, the plurality of ribs comprise a middle rib located adjacent to the chamber bottom, a right rib located adjacent to the chamber right side, and a left rib located adjacent to the chamber left side. Optionally, the front opening is semi-circular in shape. Optionally, the handle bottom is free. Optionally, the trigger is located in front of the handle. Optionally, the squeeze container comprises a liquid such as cold glue or icing for example. Optionally, the squeeze container comprises a nozzle comprising a nozzle tip, and optionally the nozzle tip is located in front of the front opening in step c). Optionally, the nozzle is in the form of a hollow needle. Optionally, step c) comprises dispensing the substance at room temperature. Optionally, the step of c) actuating the trigger to cause the arm to compress the squeeze container and dispense the substance from the squeeze container comprises moving the trigger toward the handle. Optionally, the trigger comprises a rear facing the handle, a front opposite the rear, a left side, a right side, a width extending from the left side to the right side, a top, and a bottom. Optionally, the trigger front side comprises a ridge extending across the width of the trigger front side. Optionally, the ridge is arc-shaped. Optionally, the trigger is pivotably attached to the handle via a pivot pin extending across the trigger and the handle. Optionally, the pivot pin is located adjacent to the trigger top and the ridge. Optionally, the handle comprises an open front, a closed rear and a cavity located in front of the closed rear and facing the trigger rear. Optionally, the handle further comprises a plurality of ribs extending from the left side to the right side across the cavity. Optionally, the applicator further comprises a spring at least partially surrounding the pivot pin that has a spring first end attached to the handle and a spring second end attached to the trigger. Optionally, the spring is configured to bias the trigger away from the handle. Optionally, the chamber rear end further comprises a semi-cylindrical rear lip extending partially around the squeeze container.

In still further embodiments, the present disclosure provides a method of reducing cloggage and/or dryness in a squeeze container that may include a liquid that includes one or more of the steps of: a) providing a squeeze container that may comprise a front end comprising a nozzle that may comprise a nozzle tip, and a rear end; b) providing a stand that may comprise a receptacle configured to receive the nozzle and may include an open top, and a bottom that may include a compressible seal that may be located below the open top and comprised of an elastomeric material and having a top surface; and c) placing the nozzle tip through the open top and onto the top surface of the compressible seal (to seal the tip). Optionally, the compressible seal is comprised of a nonstick material, such as silicone, TPR (thermoplastic rubber) and/or TPE (thermoplastic elastomer). Optionally, the top surface is circular and comprises a center and a circumference. Optionally, the top surface comprises a circular trough. Optionally, the top surface comprises a raised lip extending about the circumference. Optionally, the center is convex. Optionally, the circular trough is located between the raised lip and the convex center. Optionally, the compressible seal is cylindrical in shape and further comprises a bottom surface and a slot located between the top surface and the bottom surface. Optionally, the slot extends across a diameter of the compressible seal. Optionally, the top surface is circular and comprises a convex center. Optionally, the slot is located below the convex center. Optionally, the receptacle is conical in shape. Optionally, the stand further comprises a base located below the receptacle open top and connected to the receptacle. Optionally, the base further comprises a flat bottom surface. Optionally, the stand further comprises a cap holder extending upwardly from the base, the cap holder cylindrical in shape and comprising a plurality of vertically-oriented ribs spaced about a perimeter of the cap holder. Optionally, the base comprises a front portion located in front of the compressible seal and a rear portion located to the rear of the compressible seal. Optionally, the front portion comprises a cap holder extending upwardly from the base. Optionally, the cap holder is cylindrical in shape and comprises a plurality of vertically-oriented ribs spaced about a perimeter of the cap holder. Optionally, the base comprises an opening extending about a perimeter of the compressible seal. Optionally, the receptacle further comprises a front receptacle wall and a rear receptacle wall. Optionally, the front receptacle wall is taller than the rear receptacle wall. Optionally, the rear portion of the base is longer than the front portion of the base. Optionally, the receptacle comprises at least one inner wall located adjacent to and at least partially surrounding the compressible seal. Optionally, the receptacle further comprises at least one outer wall at least partially surrounding the at least one inner wall. Optionally, the at least one outer wall comprises a front outer wall and a rear outer wall. Optionally, the front outer wall and rear outer wall are parallel to each other, and located on opposite sides of the open top. Optionally, the at least one inner wall further comprises a wall access opening. Optionally, at least a portion of the wall access opening is located above and adjacent to the compressible seal top surface. Optionally, the receptacle comprises a hollow interior extending from the open top to the compressible seal top surface. Optionally, the hollow interior comprises a height extending from the open top to the compressible seal top surface of from about 0.25 inches to about 3 inches, as measured at its tallest portion. Optionally, the hollow interior is wider at the open top than at the compressible seal top surface. Optionally, the hollow interior comprises a width of from about 0.25 inches to about 2 inches, as measured at its widest portion. Optionally, the nozzle is in the form of a hollow needle.

BRIEF DESCRIPTION OF THE DRAWINGS

in FIG. 1, the cap of the glue has been exploded to show the cap holder.

in FIG. 7, the glue applicator trigger is in the resting position.

in FIG. 8, the glue applicator trigger has been actuated/moved toward the handle.

in FIG. 9, the glue applicator trigger is in the resting position.

in FIG. 10, the glue applicator trigger has been actuated/moved toward the handle.

FIG. 17 illustrates a side, top perspective view of the compressible seal of the stand of FIG. 16.

FIG. 18 illustrates a bottom perspective view of the compressible seal of FIG. 17.

FIG. 19 illustrates a top plan view of the compressible seal of FIG. 18.

FIG. 20 illustrates a side elevation of the compressible seal of FIG. 19.

FIG. 21 illustrates a bottom plan view of the compressible seal of FIG. 20.

FIG. 22 illustrates another side elevation of the compressible seal of FIG. 19; in FIG. 22, the compressible seal has been rotated 90 degrees relative to FIG. 20.

DETAILED DESCRIPTION

Figure 1:
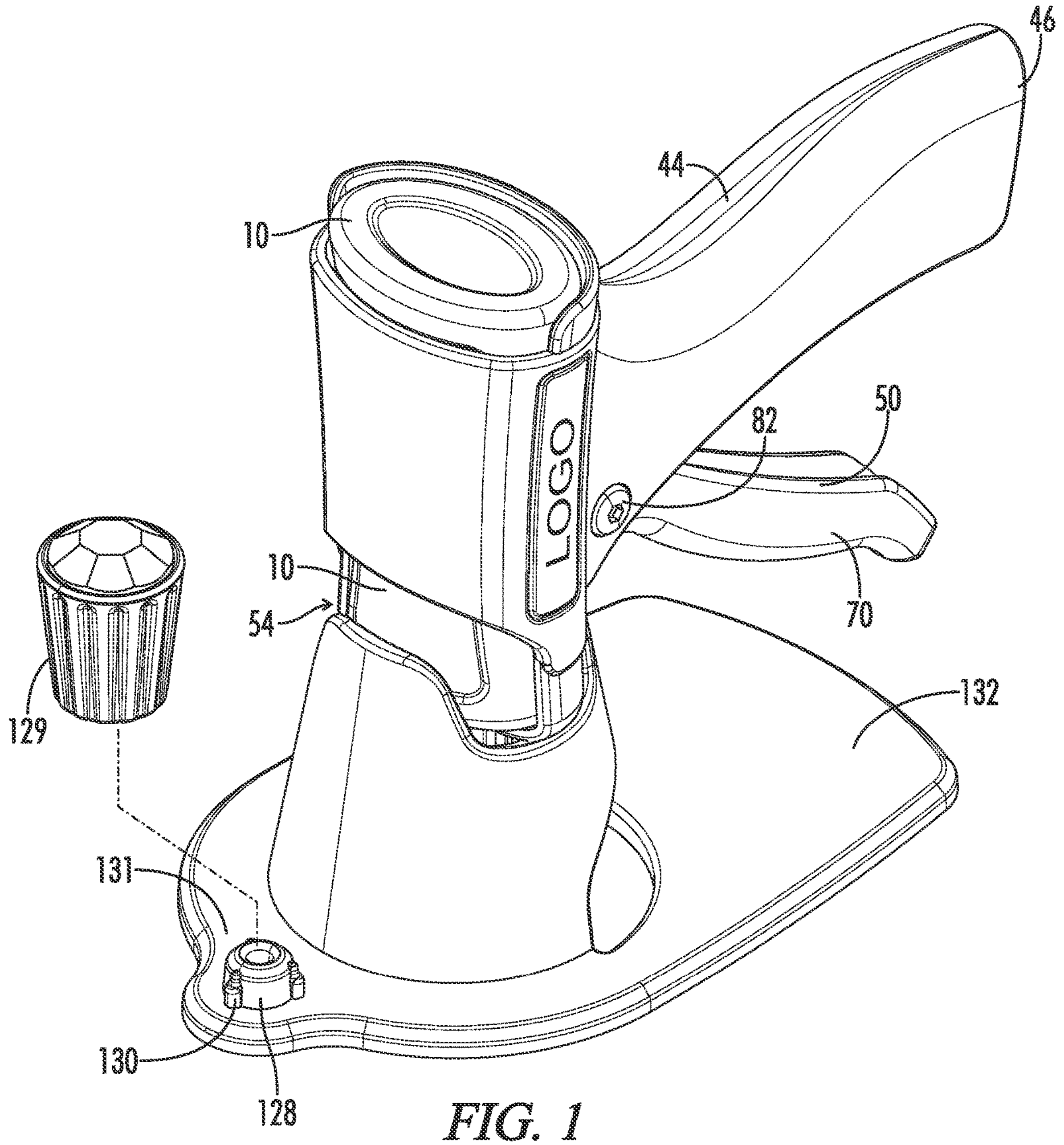
FIG. 1 illustrates a front perspective view of a stand holding a glue applicator in accordance with one embodiment of the present invention.
Figure 2:
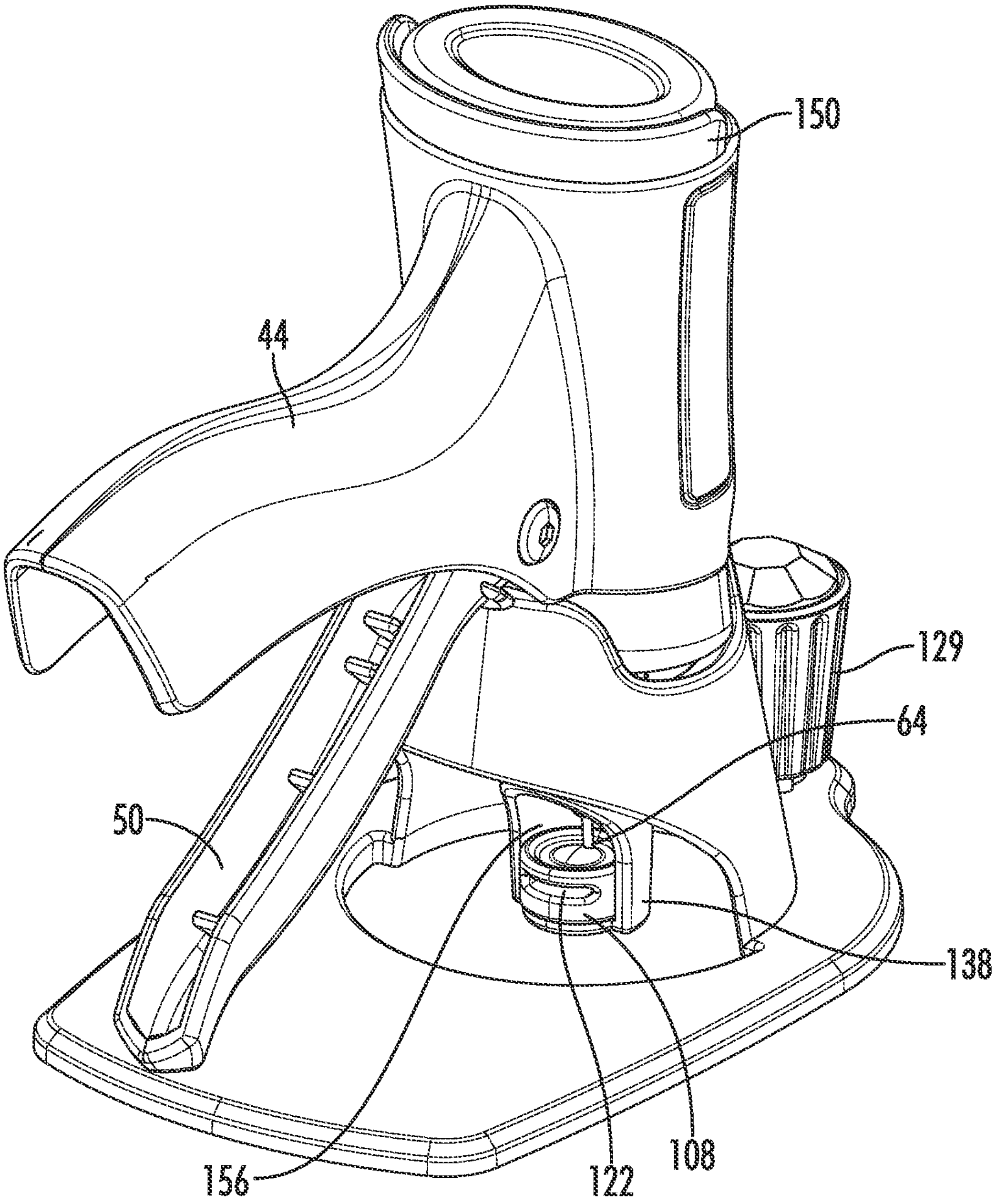
FIG. 2 illustrates a rear perspective view of the stand and glue applicator combination of FIG. 1.
Figure 3:
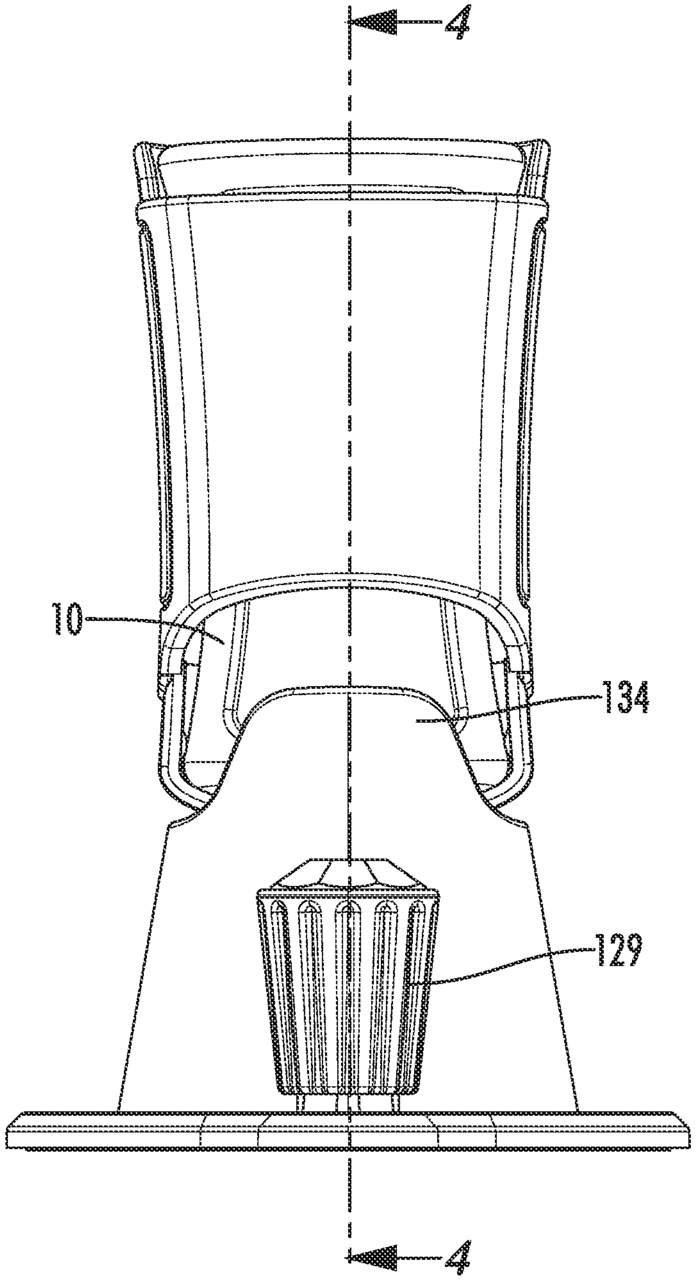
FIG. 3 illustrates a front elevation view of the stand and glue applicator combination of FIG. 2.

With reference to FIGS. 1-26, the present disclosure provides an applicator generally designated by the numeral 12 and a stand generally designated by the numeral 100. In the drawings, not all reference numbers are included in each of the drawings for the sake of clarity. FIGS. 1-26 are CAD drawings drawn to scale, however, it will be appreciated that other dimensions are possible.

The Applicator

Referring further to FIGS. 1-14, in some embodiments, the applicator 12 may include an applicator front end 14, an applicator rear end 16, an applicator length 18 extending from the applicator front end 14 to the applicator rear end 16, an applicator top 20, an applicator bottom 22, an applicator height 24 extending from the applicator top 20 to the applicator bottom 22 and generally perpendicular to the applicator length 18. The applicator may further include a chamber 26, which may include a chamber front end 28 comprising a front opening 30, a chamber rear end 32, and a chamber length 34 extending from the chamber front end 28 to the chamber rear end 32. The chamber 26 may be configured to house the squeeze container 10. The applicator 12 may also include at least one wall 36 comprising an exterior surface 38 and an interior surface 40. The at least one wall 36 may at least partially surround the chamber 26, as shown in FIGS. 1-14. The at least one wall 36 may further include a plurality of ribs 42 that are spaced about a perimeter of the interior surface 40 and protrude into the chamber 26. Without being bound by any particular theory, the plurality of ribs 42 are configured to compress the squeeze container 10 in order to aid the dispensing of material from the squeeze container 10. The applicator 12 may also include a handle 44 that may extend generally downwardly from the at least one wall 36. The handle 44 may include a handle bottom 46, and a handle height 48 that may be generally parallel to the applicator height 24. The applicator 12 may also include a trigger 50 located that may be located adjacent to the handle 44 (and optionally located in front of the handle 44). The trigger 50 may be configured to move toward and away from the handle 44. The applicator 12 may also include at least one arm 52 coupled to the trigger 50 and configured to protrude into the chamber 26 and compress a squeeze container 10 located in the chamber 26 when the trigger 50 is actuated. In the illustrated embodiment, the at least one arm 52 is the upper part of the trigger 50 and is designed to move upward into the chamber 26 to compress the squeeze container 10 when the trigger 50 is actuated, as shown by comparing FIG. 8 with FIG. 7 and FIG. 10 with FIG. 9.

The user may insert a squeeze container 10 comprising a substance into the chamber 26 so that at least a portion of the squeeze container 10 (e.g., the nozzle) extends through the forward opening 30 and the plurality of ribs 42 at least partially compress the squeeze container 10. In some embodiments, the squeeze container 10 is removable so that a user may remove the squeeze container 10 to either refill it or discard it and use a new squeeze container.

The user may actuate the trigger 50 to cause the arm 52 to move toward and compress the squeeze container 10, which in turn causes the substance to be dispensed from the squeeze container 10. For example, as shown by comparing FIG. 8 with FIG. 7 and FIG. 10 with FIG. 9, the user actuates the illustrated embodiment by moving the trigger 50 rearwardly toward the handle 44.

Optionally, as shown in FIGS. 1-14, the chamber 26 comprises a partially open top 54. Optionally, as shown in FIGS. 1-14, the chamber rear 32 comprises a rear opening 56. Optionally, as shown in FIGS. 1-14, the chamber 26 comprises a chamber bottom 58 that may include a hole 152 receiving the arm 52, a chamber left side 60, a chamber right side 62, and a chamber length 34 extending from the chamber left side 60 to the chamber right side 62 and generally perpendicular to the applicator height 24 and length 18. Optionally, as shown in FIGS. 1-14, the plurality of ribs 42 comprise three ribs spaced substantially equally apart. Optionally, as shown in FIGS. 1-14, the plurality of ribs 42, comprise a middle rib located adjacent 42 (i.e., at or near) to the chamber bottom 58 that may be spaced in the center and aligned with the arm 52, a right rib 42 located adjacent to the chamber right side 62, and a left rib 42 located adjacent to the chamber left side 60. Optionally, the plurality of ribs 42 are located not more than 0.5 inches from the front opening 30, more preferably at least within 0.25 inches from the front opening 30. Optionally. the plurality of ribs 42 are located at approximately the same distance along the chamber length 34. For example, in the illustrated embodiment, the left rib 42 and right rib 42 are located equidistant from the front opening 30 and the middle rib 42 is located less than 0.25 inches behind the left and right ribs 42. Optionally, the plurality of ribs 42 are rectangular in shape.

Optionally, as shown in FIGS. 1-14, the front opening 30 is semi-circular in shape. Optionally, as shown in FIGS. 1-14, the handle bottom 46 is free. Optionally, as shown in FIGS. 1-14, the trigger 50 is located in front of the handle 44.

Optionally, the squeeze container 10 comprises a liquid. For example, in a non-limiting example, the squeeze container 10 may include icing (used for cake or cookie decorating) or cold glue that dispensed when the squeeze container 10 is compressed.

Optionally, as shown in FIGS. 1-14, the squeeze container 10 may include a nozzle 154 comprising a nozzle tip 64, and the nozzle tip 64 may be located in front of the front opening 30). Optionally, as shown in FIGS. 1-14, the nozzle 154 is in the form of a hollow needle.

Optionally, the applicator 12 is used to dispense the substance at room temperature (e.g., without heating, unlike a conventional glue gun).

Optionally, as best seen in FIGS. 7-10, actuating the trigger 50 to cause the arm 52 to compress the squeeze container 10 and dispense the substance from the squeeze container 10 comprises moving the trigger 50 toward the handle 44.

Figure 4:
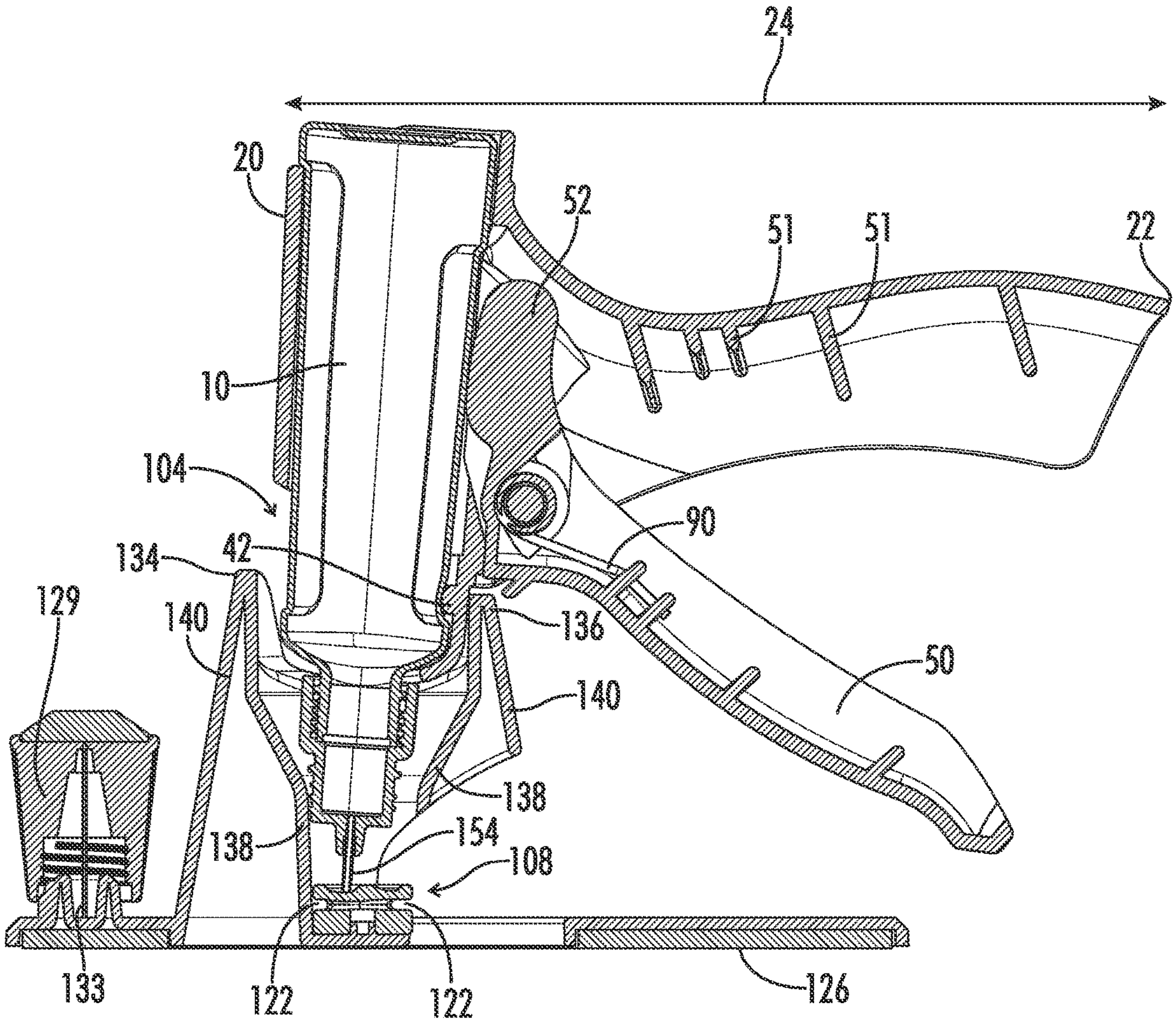
FIG. 4 illustrates a side, sectional view of the glue applicator and stand of FIG. 3, taken along line 4-4 of FIG. 3.
Figure 5:
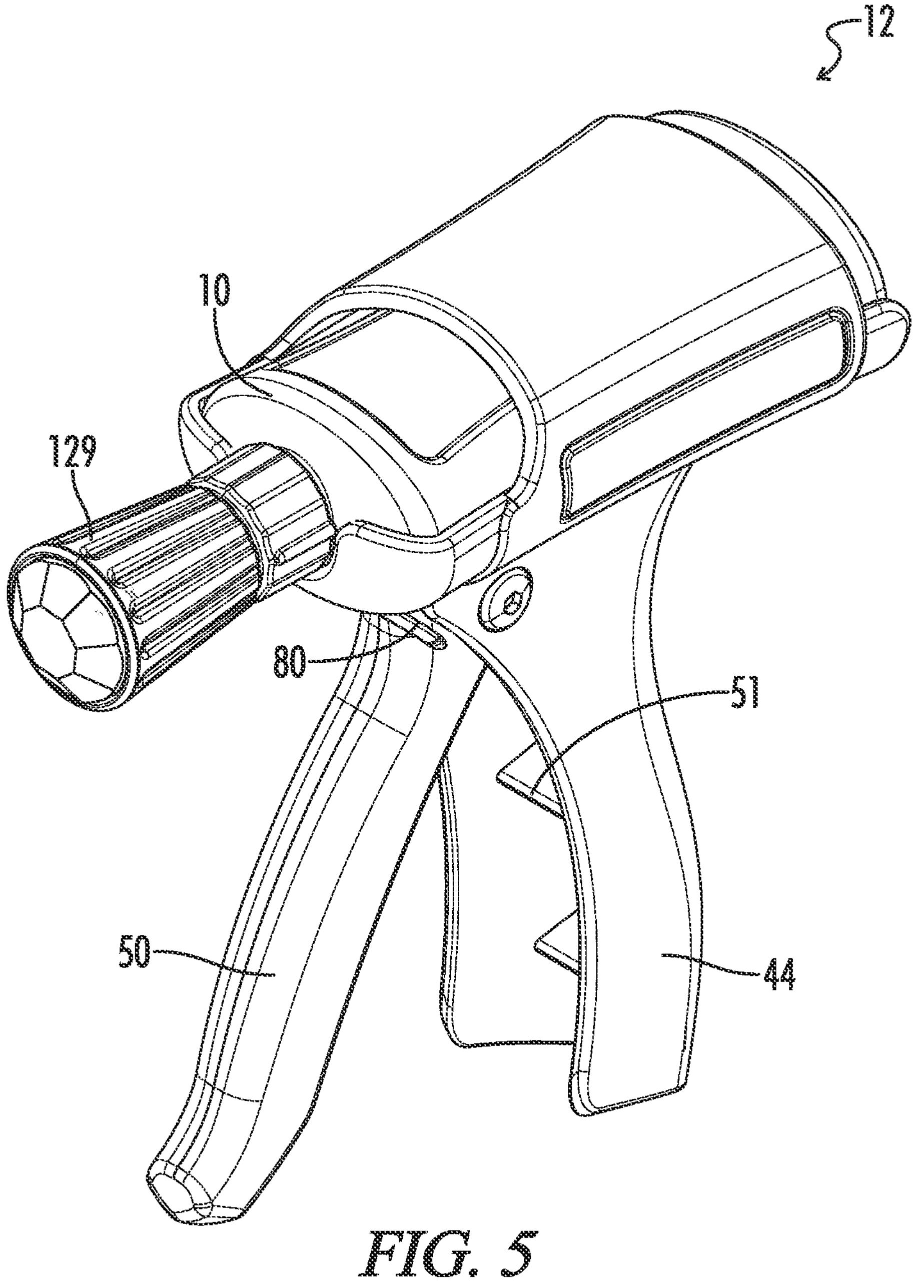
FIG. 5 illustrates a front perspective view of the glue applicator of FIG. 4 with the cap on the glue bottle.
Figure 6:
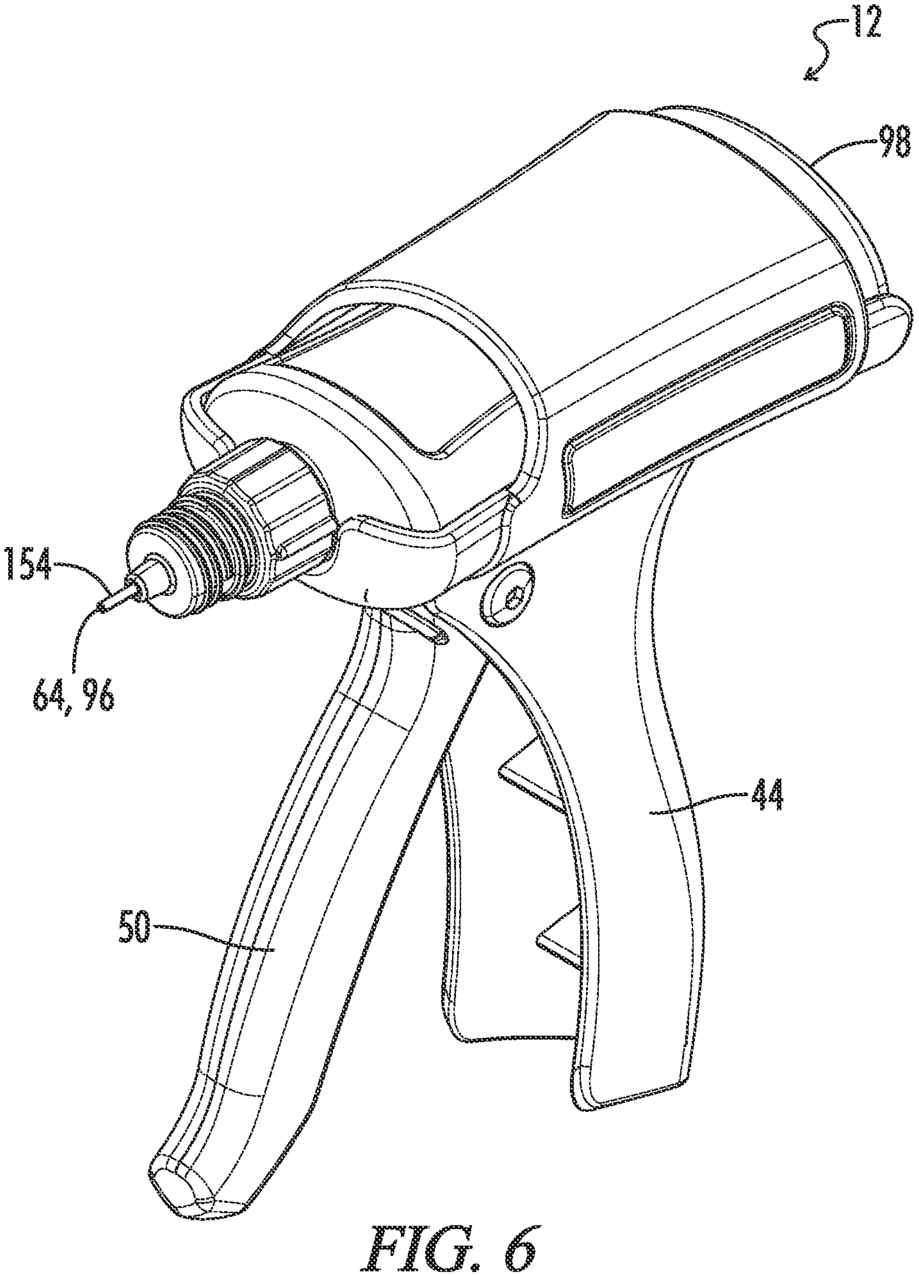
FIG. 6 illustrates a front perspective view of the glue applicator of FIG. 5 without the cap on the glue bottle.
Figure 7:
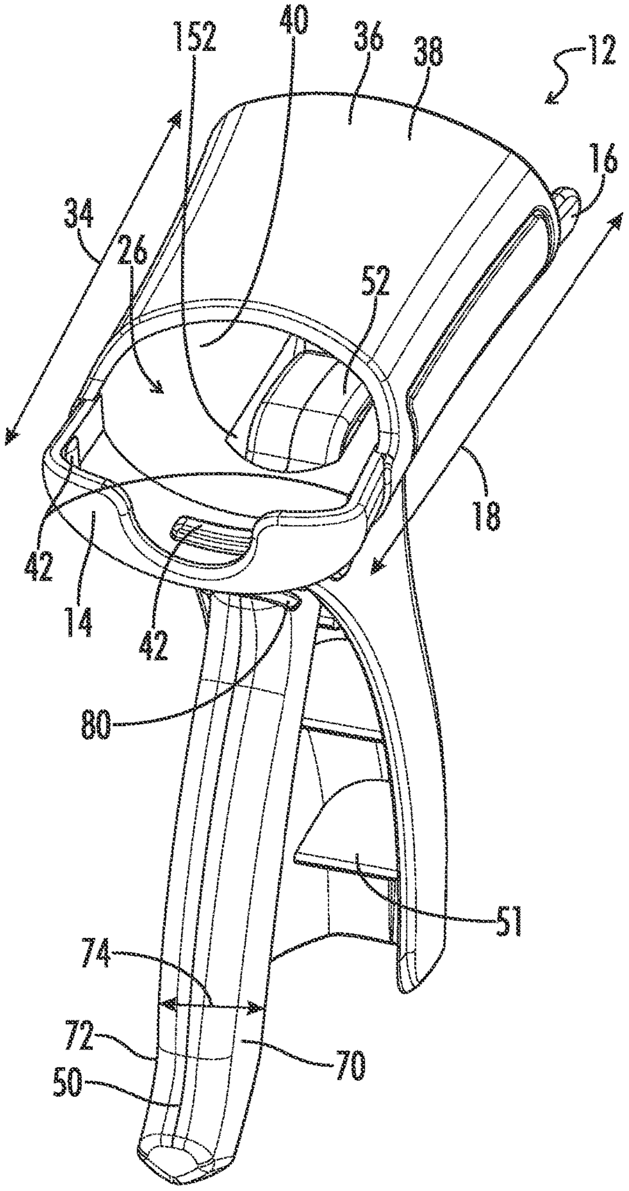
FIG. 7 illustrates a front perspective view of the glue applicator of FIG. 6 without the glue bottle.
Figure 8:
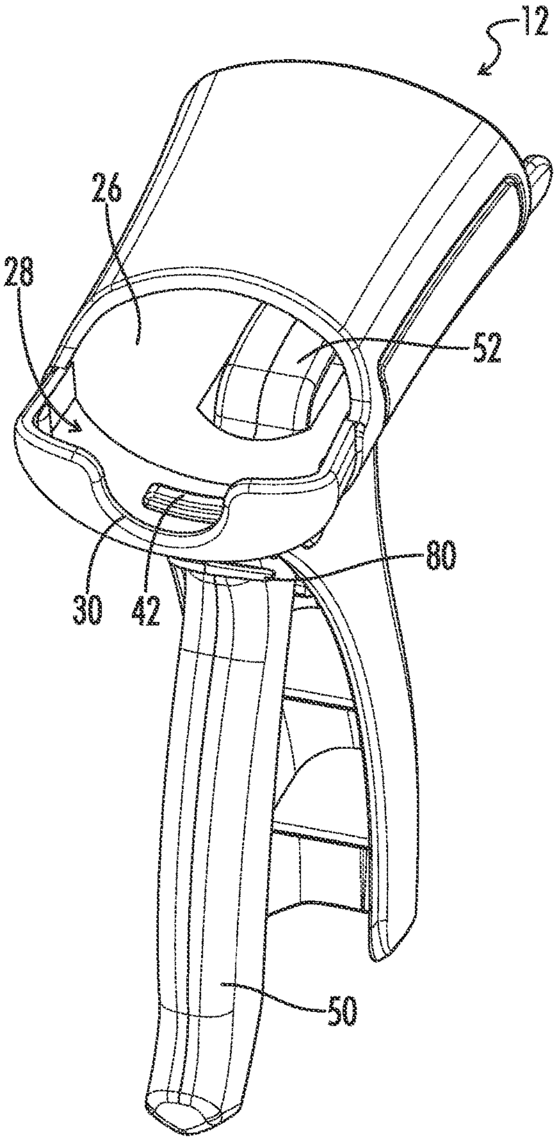
FIG. 8 illustrates a front perspective view of the glue applicator of FIG. 7.
Figure 9:
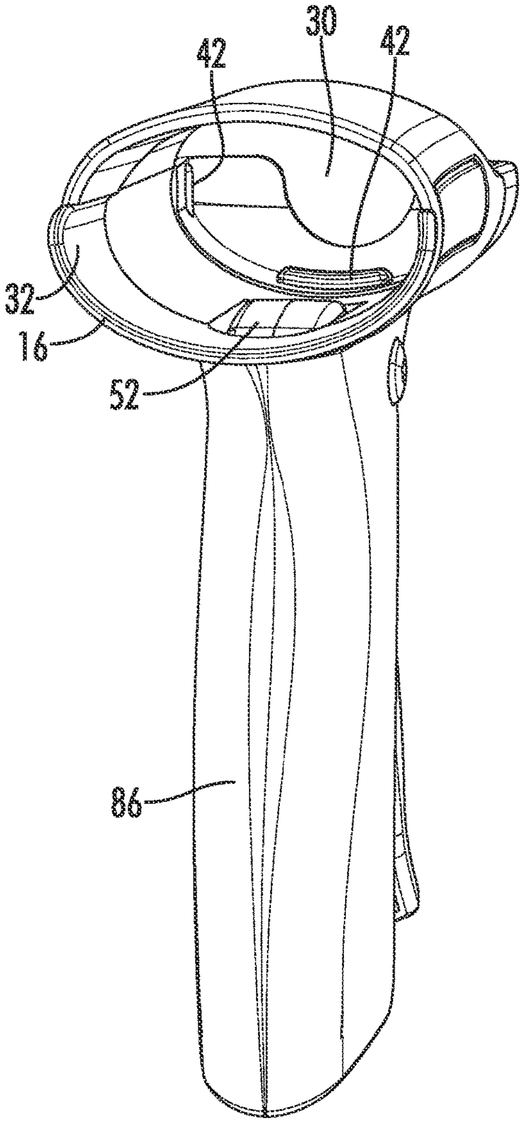
FIG. 9 illustrates a rear perspective view of the glue applicator of FIG. 8.
Figure 10:
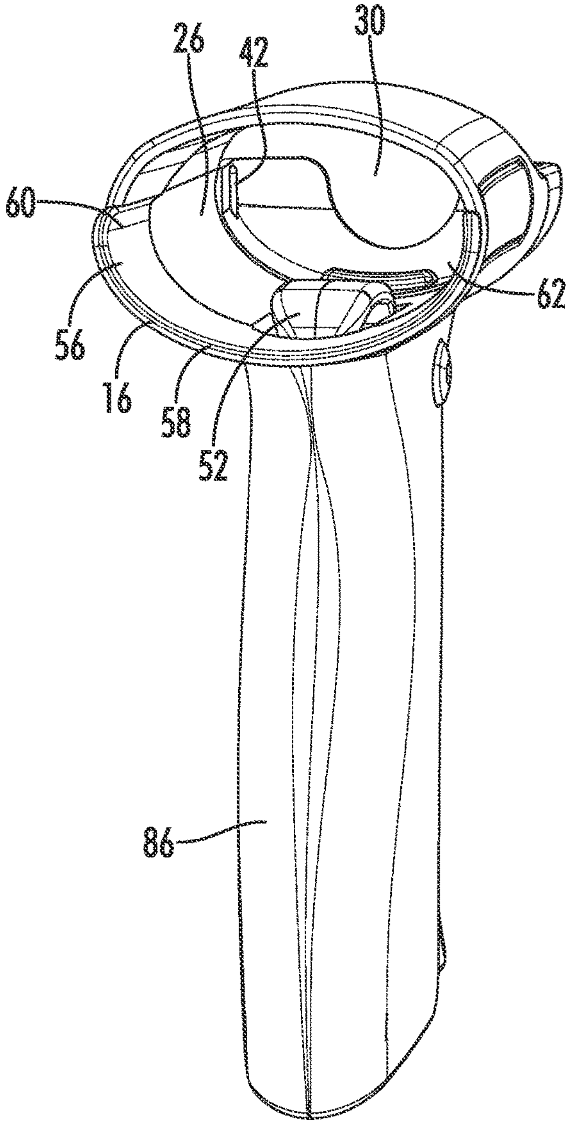
FIG. 10 illustrates a rear perspective view of the glue applicator of FIG. 9.
Figure 11:
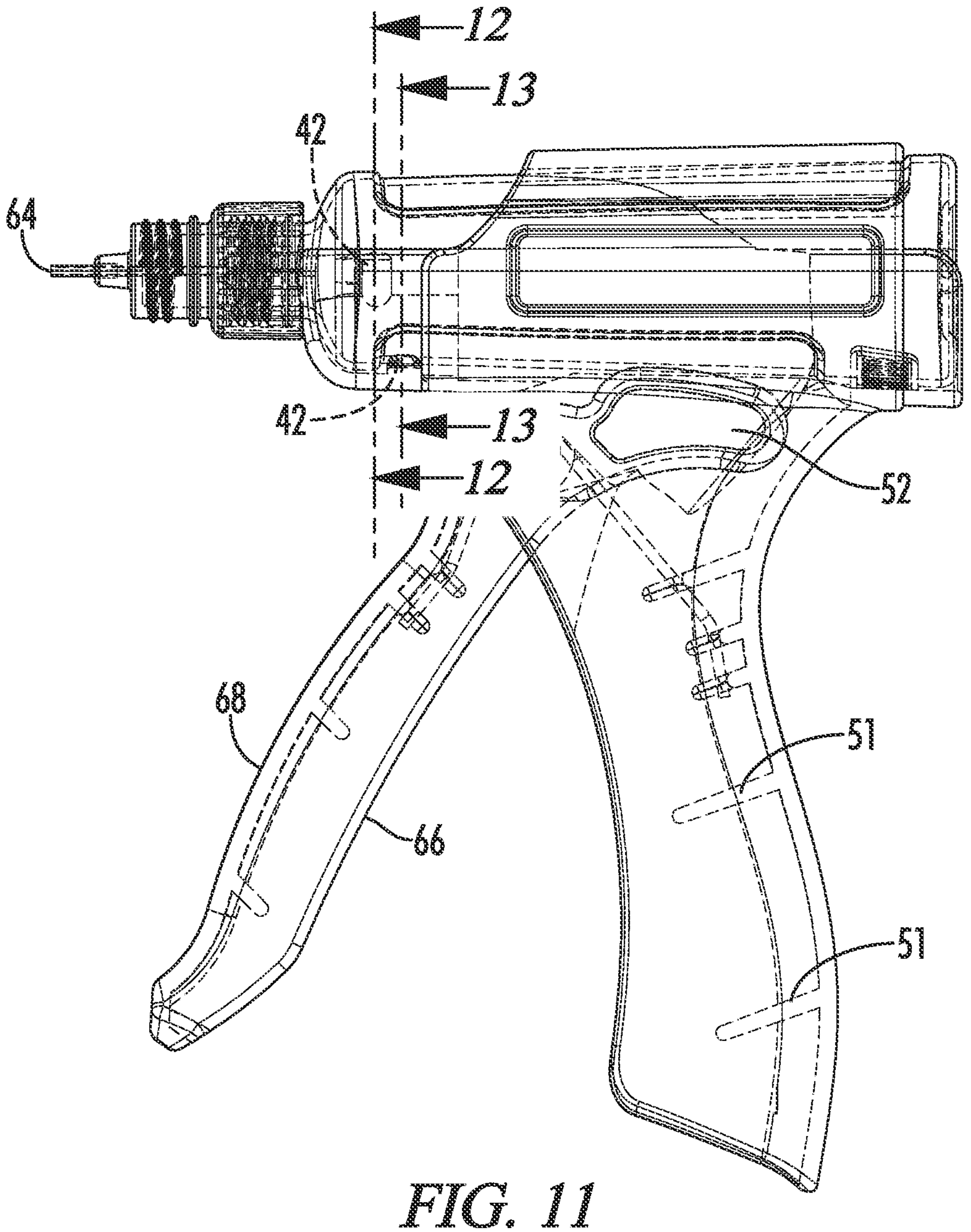
FIG. 11 illustrates a side elevation view of the glue applicator of FIG. 6 without the cap on the glue bottle.
Figure 12:
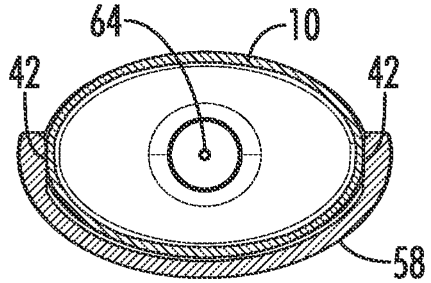
FIG. 12 illustrates a sectional view of the glue applicator of FIG. 11, taken along line 12-12 of FIG. 11.
Figure 13:
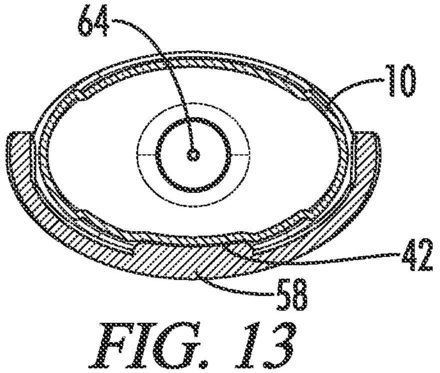
FIG. 13 illustrates a sectional view of the glue applicator of FIG. 11, taken along line 13-13 of FIG. 11.
Figure 14:
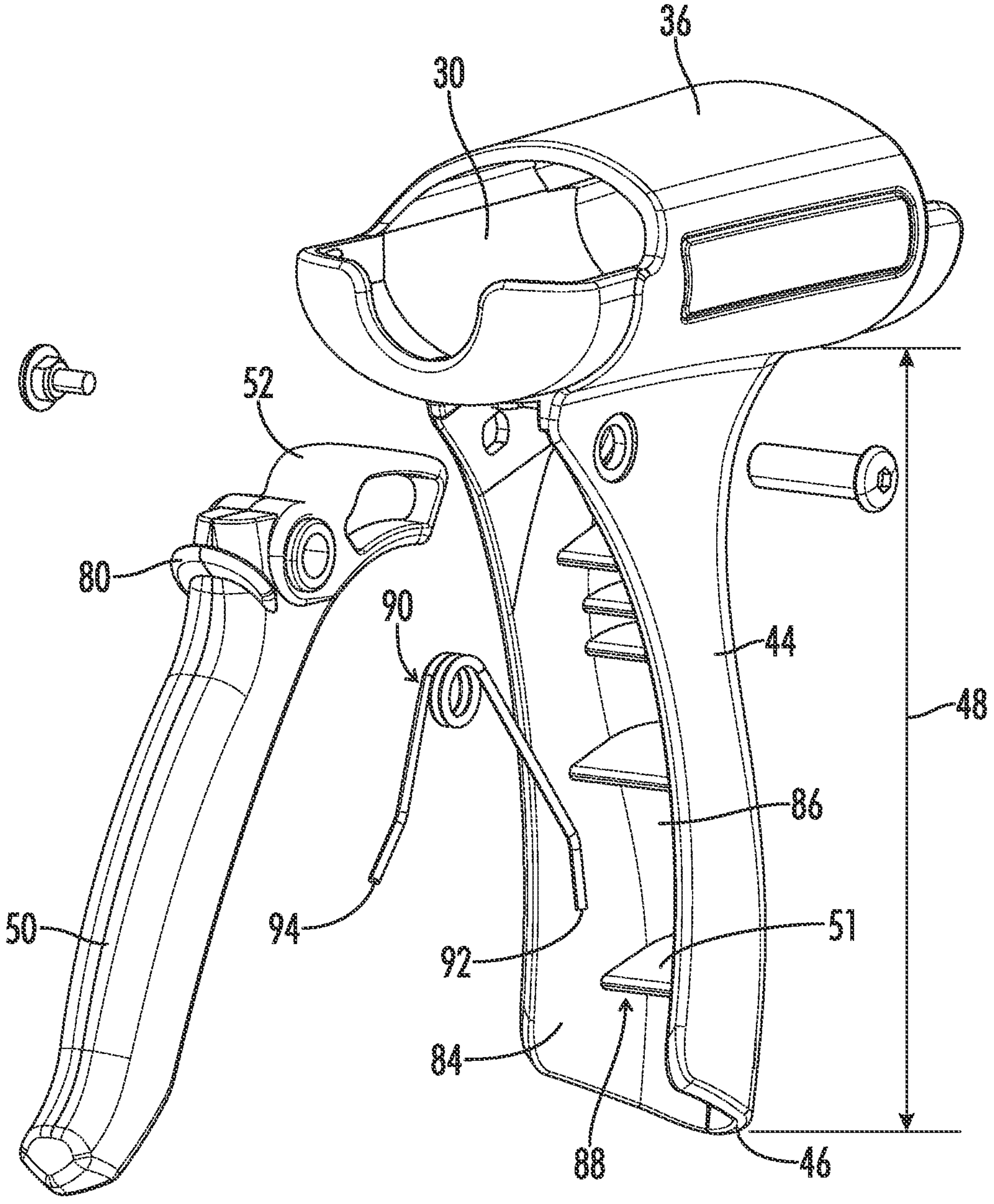
FIG. 14 illustrates a front perspective, exploded view of the glue applicator of FIG. 6 without the glue bottle.
Figure 15:
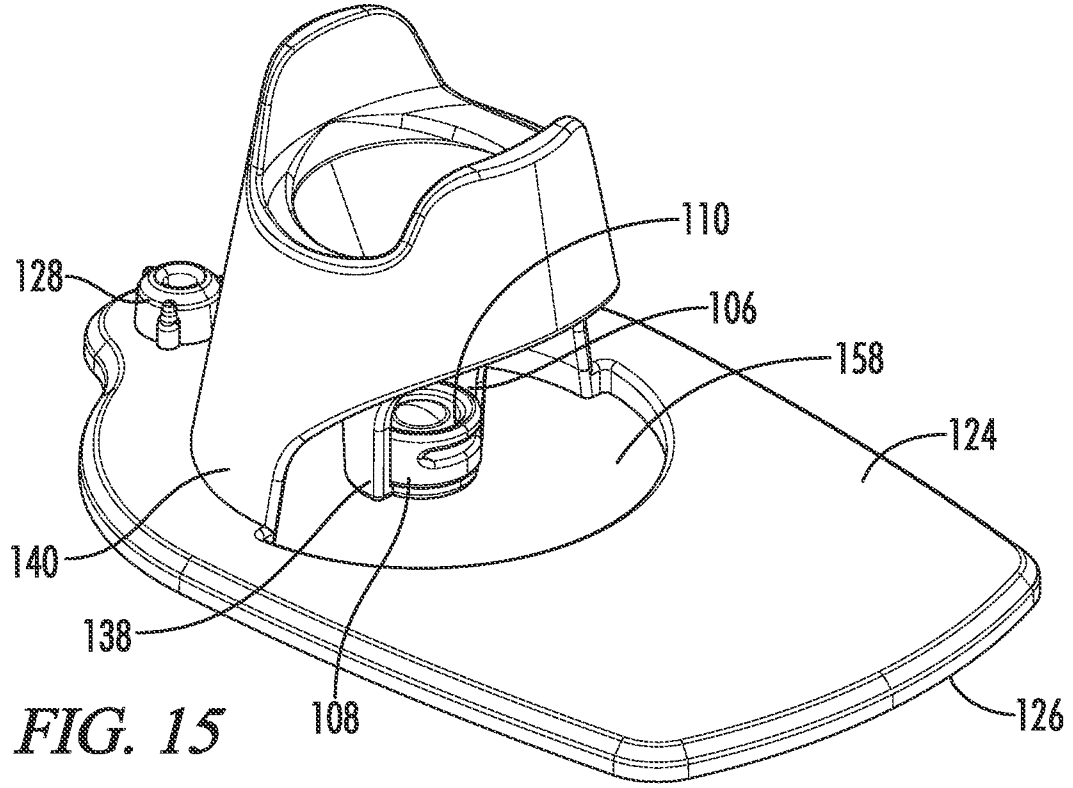
FIG. 15 illustrates a side perspective view of the stand of FIG. 1.

Optionally, as shown in FIGS. 1-14, the trigger 50 comprises a rear 66 facing the handle 44, a front 68 opposite the rear 66, a left side 70, a right side 72, a width 74 extending from the left side 70 to the right side 72, a top 76, and a bottom 78. Optionally, as shown in FIGS. 1-14, the trigger front side 68 comprises a ridge 80 that may extend across the width 74 of the trigger front side 68 and act as a guide against which the user's pointer finger may be positioned. Optionally, as best seen in FIGS. 4, 8 and 14, the ridge 80 is arc-shaped and extends upwardly at an angle. Optionally, the user places his palm against the handle 44 and his pointer ringer directly below and against the ridge 80.

Optionally, as shown in FIGS. 1-14, the trigger 50 is pivotably attached to the handle 44 via a pivot pin 82 that may extend across the trigger 50 and the handle 44 so that the trigger 50 may pivot toward away from the handle 44. Optionally, as shown in FIGS. 1-14, the pivot pin 82 is located adjacent to the trigger top 76 and the ridge 80.

Optionally, as shown in FIGS. 1-14, the handle 44 comprises an open front 84, a closed rear 86 and a cavity 88 located in front of the closed rear 86 and facing the trigger rear 66. Optionally, as shown in FIGS. 1-14, the handle 44 further comprises a plurality of ribs 51 extending from the left side to the right side across the cavity 88. Optionally, as shown in FIGS. 1-14, the applicator 12 further includes a spring 90 at least partially surrounding the pivot pin 82 and having a spring first end 92 attached to the handle 44 and a spring second end 94 attached to the trigger 50. Optionally, as shown in FIGS. 1-14, the spring 90 is configured to bias the trigger 50 away from the handle 44.

Optionally, as shown in FIGS. 1-14, the chamber rear end 32 further comprises a semi-cylindrical rear lip 150 extending partially around the squeeze container 10 to support the rear of the squeeze container 10.

The Stand

Figure 24:
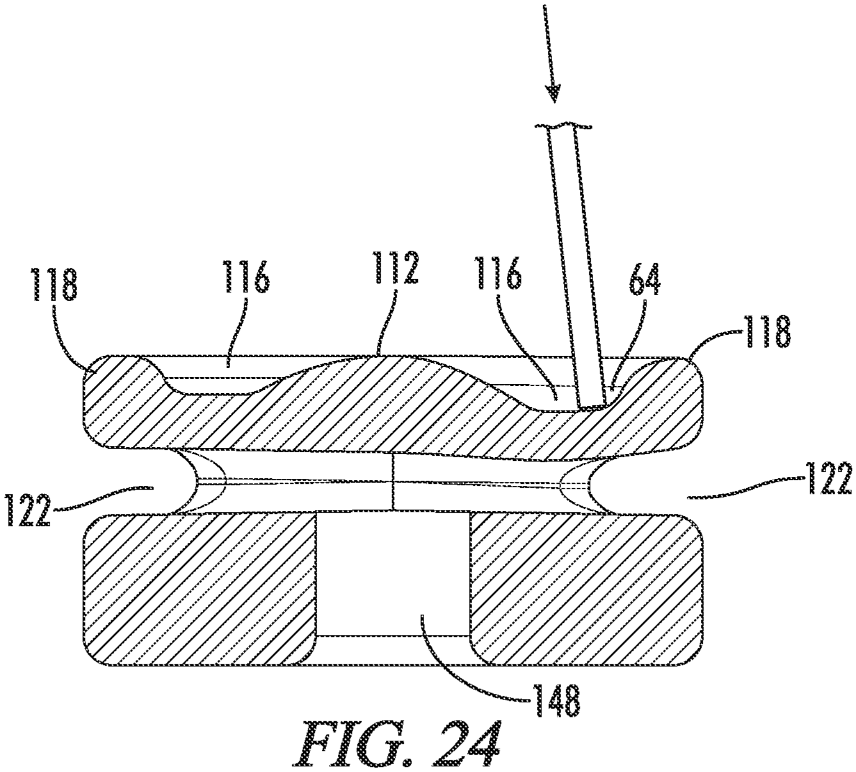
FIG. 24 illustrates a sectional view of the compressible seal of FIG. 20, taken along line 23-23 of FIG. 20, with a nozzle of a glue bottle to illustrate how the nozzle may interact with the compressible seal.
Figure 25:
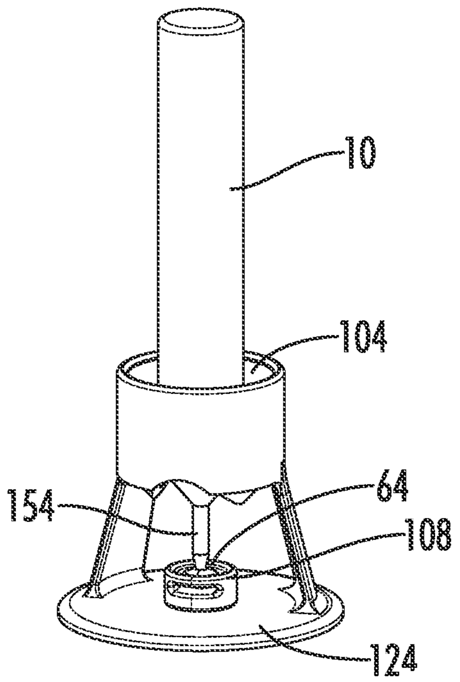
FIG. 25 illustrates a side perspective view of a stand and a glue bottle in accordance with another embodiment of the present invention.
Figure 26:
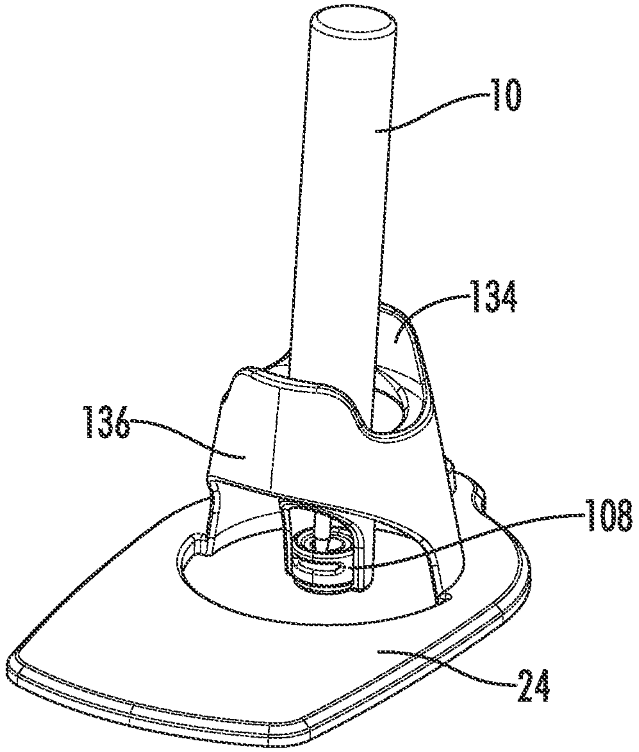
FIG. 26 illustrates a side perspective view of a stand and a glue bottle in accordance with yet another embodiment of the present invention.

Referring to FIGS. 1-4 and 15-26, the present disclosure also provides stands 100 that may be used with an applicator 12 holding an applicator 12 in the chamber 26 (as shown in 1-4 and FIGS. 15-16) or with a squeeze container 10 without an applicator 12 (as shown in FIGS. 25-26).

As shown in FIGS. 1-4 and 15-26, the stand 100 may include a receptacle 102 that is configured to receive the nozzle 154 of the squeeze container 10. As shown in FIGS. 1-4 and 15-26, the receptacle 102 may include an open top 104, and a bottom 106 located beneath the open top 104 and that comprises a seal 108. The seal may be a compressible seal 108, comprised of an elastomeric material and have a top surface 110. A user may place the nozzle tip 64 of the squeeze container 10 through the open top 104 and onto the top surface of the compressible seal 108 to seal the tip 64, as shown in FIGS. 1-4 and 15-26 for example. Without being bound by any particular theory, the seal 108 may allow a user to place the nozzle 154 in the receptacle hollow interior 142 without placing the cap 129 back on the squeeze container 10 without fear of the liquid in the squeeze container 10 drying out and/or clogging because the seal 108 may seal the nozzle tip 64, as best seen in FIG. 24. In other words, the seal 108 may obviate the need to put the cap 129 back on. In particular and without being bound by any particular theory, placing the nozzle tip 64 on the seal top surface 110 may slightly deflect the top surface 110 downward and seal the nozzle tip 64.

Optionally, the seal 108 (which may be compressible) is comprised of a nonstick material to prevent the liquid in the squeeze container 10 from sticking to the seal 108. In a preferred embodiment, the liquid is cold glue and the seal 108 is comprised of a material that does not stick to glue such as silicone, TPR (thermoplastic rubber) and/or TPE (thermoplastic elastomer).

Optionally, as shown in FIGS. 1-4 and 15-26, the top surface 110 is circular and comprises a center 112 and a circumference. Optionally, as shown in FIGS. 1-4 and 15-26, the top surface 110 comprises a circular trough 116 to, for example, hold the nozzle tip 64, as shown in FIG. 24. Optionally, as shown in FIGS. 1-4 and 15-26, the top surface 110 comprises a raised lip 118 extending about the circumference. Optionally, as shown in FIGS. 1-4 and 15-26, the center 112 is convex 112. Optionally, as shown in FIGS. 1-4 and 15-26, the circular trough 116 is located between the raised lip 118 and the convex center 112. Optionally, as shown in FIGS. 1-4 and 15-26, the seal 108 is cylindrical in shape and includes a bottom surface 120 and a slot 122 located between the top surface 110 and the bottom surface 120 (to allow for compression of the seal 108 for better sealing of the nozzle tip 64). Optionally, as seen in FIG. 22 where the front and rear sides of the slot 122 are aligned (and opposite sides of the circle), the slot 122 extends across a diameter of the seal 108.

Optionally, as shown in FIGS. 2, 4 17, 23 and 24, for example, the slot 122 is located below the convex center 112.

Optionally, as shown in FIGS. 1-4, 15-16 and 25-26, the receptacle 102 is conical in shape. Optionally, as shown in FIGS. 1-4, 15-16 and 25-26, the stand 100 further comprises a base 124 located below the receptacle open top 104 and connected to the receptacle 102.

Optionally, the base 124 further includes a flat bottom surface 126 that optionally includes foam or another non-slip material to prevent that stand 100 from sliding on a table.

Optionally, as shown in FIGS. 1-4, 15-16 and 26, the stand 100 includes a cap holder 128 extending upwardly from the base 124. Optionally, as shown in FIGS. 1-4, 15-16 and 26, the cap holder 128 is cylindrical in shape and includes a plurality of ribs 130 that are oriented vertically and are located about a perimeter of the cap holder 128.

Optionally, as shown in FIGS. 1-4, 15-16 and 26, the base 124 comprises a front portion 131 located in front of the seal 108 and a rear portion 132 located to the rear of the seal 108. Optionally, the front portion 131 comprises the cap holder 128.

Optionally, as shown in FIGS. 1-4,15-16 and 26, the base 124 comprises an opening 158 extending about a perimeter of the compressible seal 108.

Optionally, as shown in FIGS. 1-4,15-16 and 26, the receptacle 102 further comprises a front receptacle wall 134 and a rear receptacle wall 136. Optionally, as shown in FIGS. 1-4,15-16 and 26, the front receptacle wall 134 is taller than the rear receptacle wall 136. Optionally, as shown in FIGS. 1-4,15-16 and 26, the rear portion of the base 132 is longer than the front portion of the base 131.

Optionally, as shown in FIGS. 1-4,15-16 and 26, the receptacle 102 comprises at least one inner wall 138 located adjacent to and at least partially surrounding the seal 108. Optionally, as shown in FIGS. 1-4,15-16 and 26, the receptacle 102 further comprises at least one outer wall 140 at least partially surrounding the at least one inner wall 138. Optionally, as shown in FIGS. 1-4,15-16 and 26, the at least one outer wall 140 extends upwardly from the base 124 and the at least one inner wall 138 is not directly connected to the base 124. Optionally, as shown in FIGS. 1-4,15-16 and 26, the at least one outer wall 140 comprises a front outer wall 134 and a rear outer wall 136. Optionally, as shown in FIGS. 1-4,15-16 and 26, the front outer wall 134 and rear outer wall 136 are parallel to each other. Optionally, as shown in FIGS. 1-4,15-16 and 26, the front outer wall 134 and rear outer wall 136 are located on opposite sides of the open top 104. Optionally, as shown in the illustrations (including in FIG. 4 for example), the front and rear outer walls 134 and 136 are inclined/angled inwardly so that the overall shape of the receptacle 102 is a cone.

Optionally, as shown in FIGS. 1-4,15-16 and 26, the at least one inner wall 138 further comprises a wall access opening 156. Optionally, as shown in FIGS. 1-4,15-16 and 26, at least a portion of the wall access opening 156 is located above and adjacent to the seal top surface 110 to allow a user access to clean the compressible seal 108.

Optionally, as shown in FIGS. 1-4,15-16 and 25-26, the receptacle 102 comprises a hollow interior 142 extending from the open top 104 to the seal top surface 110. Optionally, the hollow interior 142 comprises a height 144 extending from the open top 104 to the compressible seal top surface 110 of from about 0.25 inches to about 3 inches, as measured at its tallest portion (as noted above, the front receptacle wall 134 and a rear receptacle wall 136 may have different heights).

Optionally, as shown in FIGS. 1-4,15-16 and 26, the hollow interior 142 is wider at the open top than at the compressible seal top surface. Optionally, the hollow interior 142 comprises a width of from about 0.25 inches to about 2 inches, as measured at its widest portion.

Figure 16:
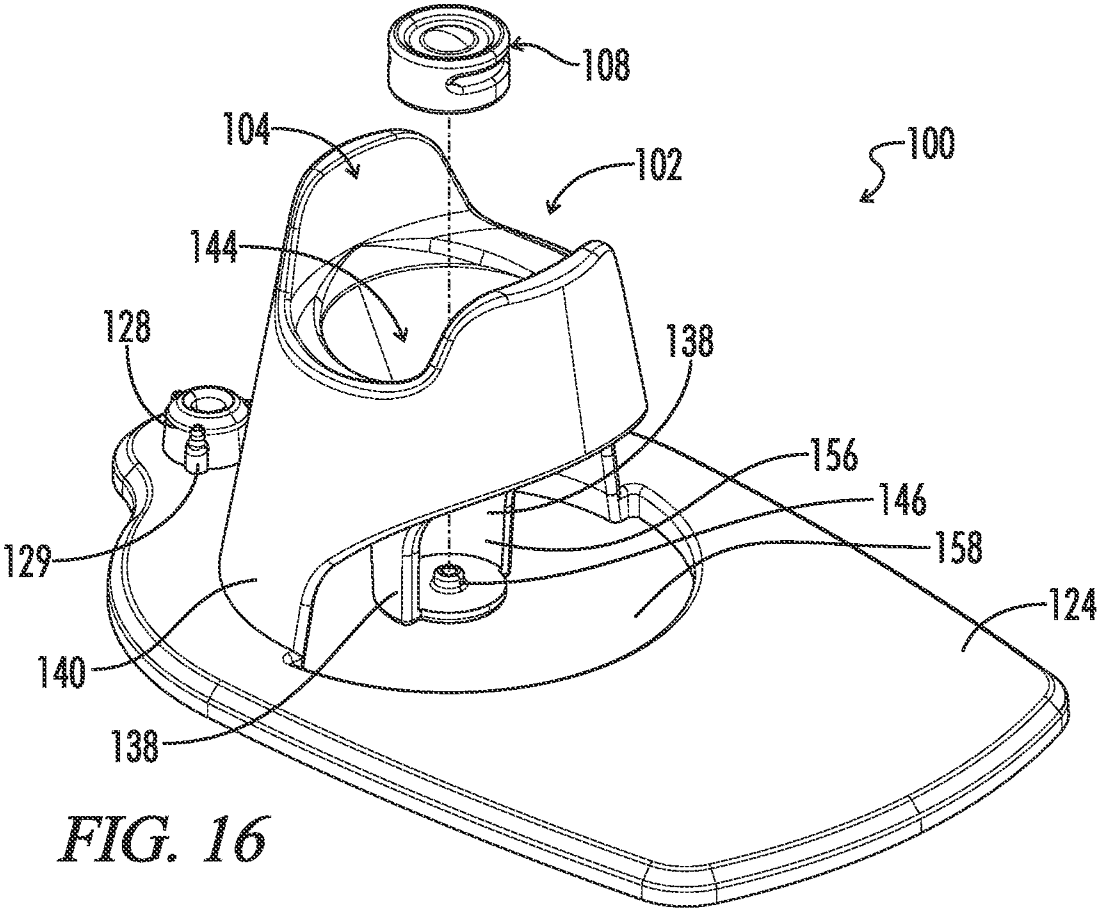
FIG. 16 illustrates a side perspective, exploded view of the stand of FIG. 15.
Figure 23:
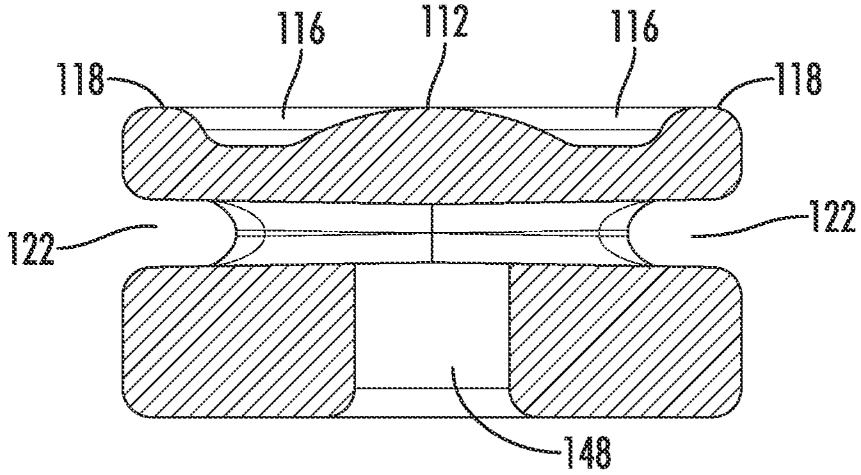
FIG. 23 illustrates a sectional view of the compressible seal of FIG. 20, taken along line 23-23 of FIG. 20.

Optionally, as shown in FIG. 16 for example the seal 108 is affixed to the stand using a post 146 that passes vertically upward through the seal bottom surface 120.

| Part List | |
|---|---|
| Squeeze container | 10 |
| Applicator | 12 |
| Applicator front end | 14 |
| Applicator rear end | 16 |
| Applicator length | 18 |
| Applicator top | 20 |
| Applicator bottom | 22 |
| Applicator height | 24 |
| Chamber | 26 |
| Chamber front end | 28 |
| Front opening | 30 |
| Chamber rear end | 32 |
| Chamber length | 34 |
| Wall | 36 |
| Wall exterior surface | 38 |
| Wall interior surface | 40 |
| Plurality of ribs | 42 |
| Handle | 44 |
| Handle bottom | 46 |
| Handle height | 48 |
| Trigger | 50 |
| Handle Ribs | 51 |
| Arm | 52 |
| Partially open top | 54 |
| Chamber rear opening | 56 |
| Chamber bottom | 58 |
| Chamber left side | 60 |
| Chamber right side | 62 |
| Nozzle tip | 64 |
| Trigger rear | 66 |
| Trigger front side | 68 |
| Trigger left side | 70 |
| Trigger right side | 72 |
| Trigger width | 74 |
| Trigger top | 76 |
| Trigger bottom | 78 |
| Arc-shaped (angled) ridge | 80 |
| Pivot pin | 82 |
| Handle open front | 84 |
| Handle closed rear | 86 |
| Cavity | 88 |
| Spring | 90 |
| Spring first end | 92 |
| Spring second end | 94 |
| Squeeze container front end | 96 |
| Squeeze container rear end | 98 |
| Stand | 100 |
| Receptacle | 102 |
| Receptacle open top | 104 |
| Receptacle bottom | 106 |
| Compressible seal | 108 |
| Compressible seal top surface | 110 |
| Top surface center | 112 |
| Top surface circular trough | 116 |
| Top surface raised lip | 118 |
| Compressible seal bottom surface | 120 |
| Slot | 122 |
| Base | 124 |
| Base flat bottom | 126 |
| Cap holder | 128 |
| Cap | 129 |
| Cap holder ribs | 130 |
| Base front | 131 |
| Base rear | 132 |
| Cap pin | 133 |
| Receptacle front wall | 134 |
| Receptacle rear wall | 136 |
| Receptacle inner wall | 138 |
| Receptacle outer wall | 140 |
| Receptacle hollow interior | 142 |
| Receptacle hollow interior height | 144 |
| Post | 146 |
| Hole in seal for post | 148 |
| Semi-cylindrical lip | 150 |

-continued

| Part List | |
|---|---|
| Hole in chamber bottom wall | 152 |
| Nozzle | 154 |
| Wall access opening | 156 |
| Base opening | 158 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. It is understood that use of the singular embraces the plural and vice versa. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously.

What is claimed is:

1. A method of dispensing a substance from a squeeze container, the squeeze container comprising a front end comprising a nozzle, a rear end comprising a base, and at least one sidewall between the front end and the rear end, the method comprising:

a) providing an applicator comprising:

i) an applicator front end;

ii) an applicator rear end;

iii) an applicator length extending from the applicator front end to the applicator rear end;

iv) an applicator top;

v) an applicator bottom;

vi) an applicator height extending from the applicator top to the applicator bottom and generally perpendicular to the applicator length;

vii) a chamber, the chamber comprising a chamber front end comprising a front opening, a chamber rear end, and a chamber length extending from the chamber front end to the chamber rear end, the chamber configured to house the squeeze container;

viii) at least one wall comprising an exterior surface and an interior surface, the at least one wall at least partially surrounding the chamber, the at least one wall further comprising a plurality of ribs spaced about a perimeter of the interior surface and protruding into the chamber, the plurality of ribs configured to compress the squeeze container;

ix) a handle extending generally downwardly from the at least one wall, the handle comprising a handle bottom;

x) a trigger; and xi) at least one arm coupled to the trigger and configured to protrude into the chamber and compress a squeeze container located in the chamber;

b) placing the squeeze container comprising a substance into the chamber so that at least a portion of the squeeze container extends through the forward opening and the plurality of ribs at least partially compress the at least one sidewall of the squeeze container; and c) actuating the trigger to cause the at least one arm to move upwardly toward and compress the at least one sidewall of the squeeze container and dispense the substance from the squeeze container, wherein the plurality of ribs are located in front of the at least one arm and fixed to the interior wall and do not move when the trigger is actuated.

2. The method of claim 1 wherein the chamber comprises a partially open top.

3. The method of claim 1 wherein the chamber rear end comprises a rear opening.

4. The method of claim 1 wherein the plurality of ribs are located not more than 0.5 inches from the front opening.

5. The method of claim 1 wherein the plurality of ribs are located at approximately the same distance along the chamber length.

6. The method of claim 1 wherein the plurality of ribs comprise three ribs spaced substantially equally apart.

7. The method of claim 1, wherein the chamber comprises a chamber bottom comprising a hole receiving the at least one arm, a chamber left side, a chamber right side, and a chamber length extending from the chamber left side to the chamber right side and generally perpendicular to the applicator height and length, wherein the plurality of ribs comprise a middle rib located adjacent to the chamber bottom, a right rib located adjacent to the chamber right side, and a left rib located adjacent to the chamber left side, and further wherein step c) further comprises actuating the trigger to cause the at least one arm to upwardly move through the hole towards the at least one sidewall of the squeeze container to compress the at least one sidewall of the squeeze container and dispense the substance from the squeeze container.

8. The method of claim 1 wherein the front opening is semi-circular in shape.

9. The method of claim 1 wherein the handle bottom is free.

10. The method of claim 1 wherein the trigger is located in front of the handle.

11. The method of claim 1 wherein the squeeze container comprises a liquid.

12. The method of claim 11 wherein the squeeze container comprises icing.

13. The method of claim 11 wherein the squeeze container comprises cold glue.

14. The method of claim 11 wherein the squeeze container comprises a nozzle comprising a nozzle tip, and further wherein the nozzle tip is located in front of the front opening in step c).

15. The method of claim 14 wherein the nozzle is in the form of a hollow needle.

16. The method of claim 1 wherein step c) comprises dispensing the substance at room temperature.

17. The method of claim 1 wherein the step of c) actuating the trigger to cause the at least one arm to move upwardly toward and compress the at least one sidewall of the container and dispense the substance from the squeeze container comprises moving the trigger toward the handle.

18. The method of claim 17 wherein the trigger comprises a rear facing the handle, a front opposite the rear, a left side, a right side, a width extending from the left side to the right side, a top, and a bottom, and further wherein the trigger front side comprises a ridge extending across the width of the trigger front side.

19. The method of claim 18 wherein the ridge is arc-shaped.

20. The method of claim 18 wherein the trigger is pivotably attached to the handle via a pivot pin extending across the trigger and the handle, and further wherein the pivot pin is located adjacent to the trigger top and the ridge.

21. The method of claim 18 wherein the handle comprises an open front, a closed rear and a cavity located in front of the closed rear and facing the trigger rear, wherein the handle further comprises a plurality of ribs extending from the left side to the right side across the cavity.

22. The method of claim 18 wherein the applicator further comprising a spring at least partially surrounding the pivot pin and having a spring first end attached to the handle and a spring second end attached to the trigger, the spring configured to bias the trigger away from the handle.

23. The method of claim 1 wherein the chamber rear end further comprises a semi-cylindrical rear lip extending partially around the squeeze container.

* * * * *